May 28, 1957 — A. GOLDSHOLL — 2,793,451
IDENTIFICATION TAG HOLDER AND TO THE MEANS FOR SECURING SAME
Filed March 22, 1954
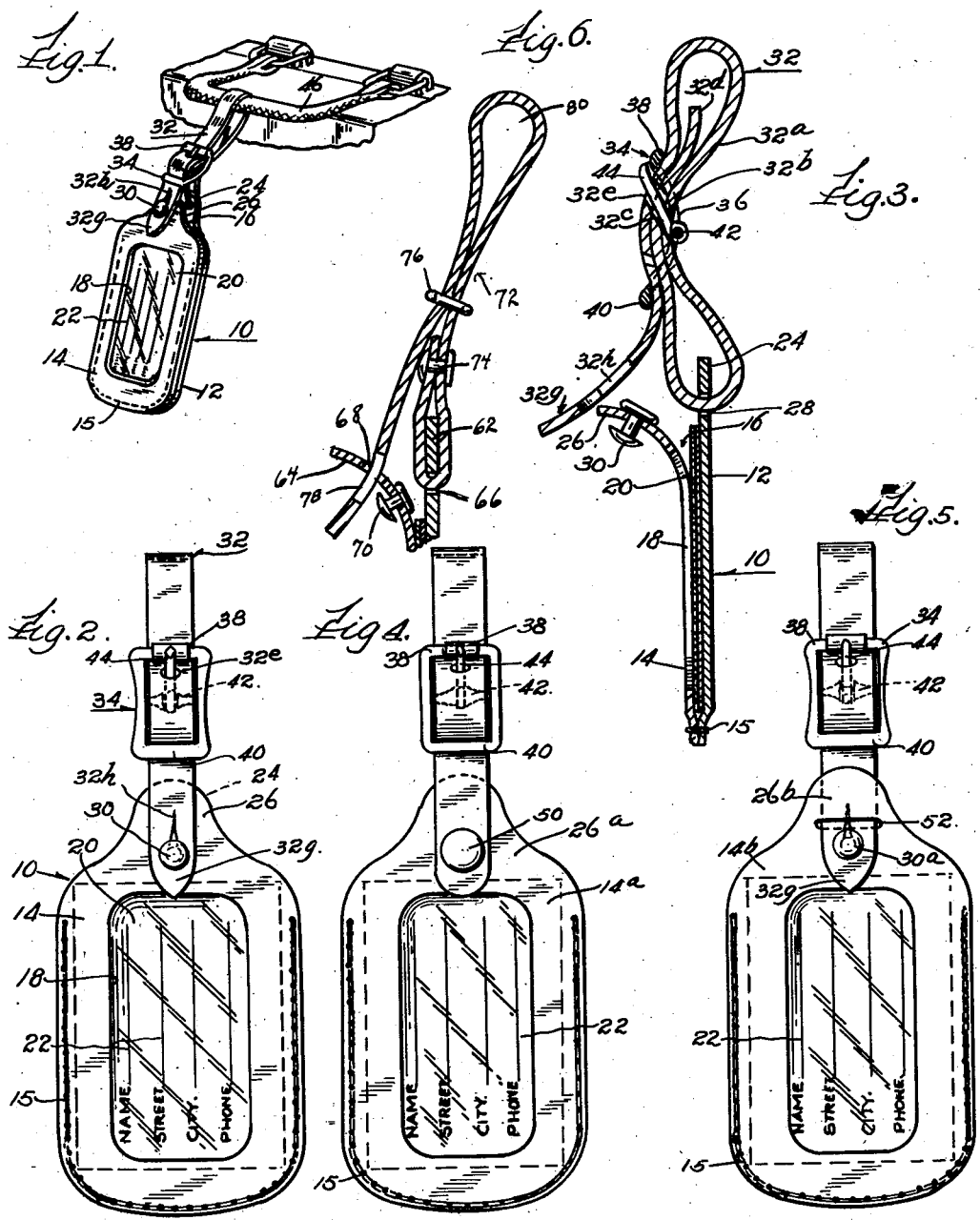
INVENTOR.
Albert Goldsholl.
BY May R. Kraus
Attorney.

United States Patent Office 2,793,451
Patented May 28, 1957

2,793,451

IDENTIFICATION TAG HOLDER AND TO THE MEANS FOR SECURING SAME

Albert Goldsholl, Chicago, Ill.

Application March 22, 1954, Serial No. 417,831

2 Claims. (Cl. 40—17)

This invention relates to identification tag holders and to the means for securing same.

One of the objects of this invention is to provide an identification tag holder which may be secured to a traveling bag, portfolio or the like in more or less of a permanent fashion, with the pocket of the tag holder being readily accessible for insertion and removal of the tag.

The identification tag holders of the prior art are of such construction that once they are attached to a traveling bag or the like, the entire holder must be detached and removed therefrom to permit the identification tag to be inserted or replaced. This invention overcomes the disadvantage inherent in the prior art constructions in that the present tag holder may be attached to the traveling bag once and need never be detached therefrom and that the identification tag while securely locked in place may be easily removed and replaced.

Other objects will become apparent as this description progresses.

In the drawings:

Fig. 1 is a perspective view of my identification tag and the means for attaching same to a bag.

Fig. 2 is a front plan view of same.

Fig. 3 is an enlarged cross sectional view taken on lines 3—3 of Fig. 2, but showing same before being locked.

Fig. 4 is a front plan view of a slightly modified construction.

Fig. 5 is a front plan view of another modification and

Fig. 6 is a cross sectional view of another modification.

Referring specifically to Figs. 1, 2 and 3, the identification tag holder generally indicated at 10 is formed preferably of leather and comprises a back section or panel 12 and a front section or panel 14 stitched together along the sides and bottom as indicated at 15 to form a pocket 16. The front section 14 has an enlarged cutout 18. Positioned inside the pocket 16 adjacent the front section 14 is a transparent window 20 made of plastic or the like. The identification tag on which a person's name and address, etc. are written is indicated at 22 and same is positioned in the pocket 16 behind the transparent window 20 to be visible therethrough.

The back and front sections 12 and 14 have extensions 24 and 26 respectively at the tops thereof. The rear extension 24 has a transverse slot 28 and the front extension 26 carries a male fastener or stud 30.

A strap generally indicated at 32 is adapted to be secured to the rear section extension 24 and same is secured in a locked position to the conventional handle of the conventional case or bag so that the front section 14 is readily accessible for insertion and removal of an identification tag as best shown in Fig. 3. The strap 32 is secured in the following manner. The conventional metal buckle generally indicated at 34 has a rectangular shaped frame which is curved as at 36. The frame has the usual top and bottom cross bars 38 and 40 and a center bar 42 midway of the length thereof which pivotally supports the usual tongue 44. The tongue is secured in a recess in the center bar 42 to prevent lateral shifting thereof. The buckle herein described is of conventional construction and is described in detail due to the manner in which the strap 32 is secured thereto.

The strap 32 is first secured to the buckle by passing a section 32a of the strap inside the buckle frame and over the center bar 42 and securing it through an opening 32b in the strap to the tongue 44 of the buckle. The strap then continues downwardly and is passed through the transverse opening 28 in the rear extension 24 and continues upwardly and inside the bottom cross bar 40 of the buckle and through an opening 32c in the strap is secured to the tongue 44. The strap continues upwardly under the top cross bar 38 and terminates as at 32d. This securely locks the strap to the tag holder 10. The section 32a of the strap 32 is looped over the handle 46 of the case or bag to which it is secured then passed downwardly under the top cross bar 38 of the buckle and through an opening 32e in the strap is secured to the tongue 44. The strap is then passed under the lower cross bar 40 and outwardly thereof. In this manner the tag is more or less permanently secured to the bag or case. The front end 32g of the strap is thus free. The front end of the strap has a vertical slit 32h which engages with the male stud 30 on the front section 14 to lock the front section against removal of the identification tag 22. To remove the identification tag from the tag holder 10 it is not necessary to detach the holder from the handle 46 to which it is attached, but merely to slip the front end 32g of the strap through the male stud 30 thus providing access to the pocket 16 of the tag holder.

The modified construction shown in Fig. 4 is similar to that just described and is attached in the same manner. The only difference being that the front extension 26a of the front section 14a of the holder is provided with the male stud of a male and female fastening member and the female part 50 is secured to the front end of the strap.

The construction shown in Fig. 5 is similar to Figs. 1 to 3, except that the front extension 26b on the front section 14b is provided with a transverse slot 52 above the male stud 30a. The front 32g of the strap passes inside the front extension 26b, through the slot 52 and outside so that it may be secured to the stud 30a. This slot construction may likewise be used with the construction shown in Fig. 4.

Figure 6 shows a modified construction. The identification tag holder 60 has back and front sections stitched together as previously described. The back and front sections have extensions 62 and 64 respectively. The rear extension has a transverse slot 66. The front section has a transverse slot 68 and carries a stud or fastener 70.

The strap generally indicated at 72 has one end passed through the slot 66 and is folded back and permanently secured as at 74 to form a permanent attachment to the tag holder. The main portion of the strap is folded and is held in such position by a rectangular shaped tuck loop 76 which is slidable on the strap. The opposite end of the strap is passed through the slot 68 and has an opening 78 which engages the stud 70 to close the tag holder. It will be seen that the looped portion of the strap 80 engages the handle.

It will be understood that various changes and modifications may be made from the foregoing without departing from the spirit and scope of the appended claims.

I claim:

1. In a structure of the character described comprising a tag holder formed of front and back sections secured together along the sides and bottom but open at the top thereof to receive a tag, said front and back sections each having an extension extending upwardly thereof with the rear extension having a slot, a buckle, a strap extending through said back extension slot and through said buckle in interlocking relation and extending above said buckle to be looped over to engage a handle of a bag or the like, the front of said strap passing through said buckle in interlocking engagement, with the lower end of said strap detachably secured to said front extension to prevent access to the interior of said tag holder.

2. In a structure of the character described comprising a tag holder formed of front and back sections secured together along the sides and bottom but open at the top thereof to receive a tag, said front and back sections each having an extension, each of said extensions having a slot, a buckle, a strap extending through the rear extension slot and through said buckle and extending above said buckle to be looped over to engage a handle of a bag or the like, the front of said strap passing through said buckle with the lower end of said strap passing through the slot in the front extension and detachably secured thereto to prevent access to the interior of the tag holder.

References Cited in the file of this patent

UNITED STATES PATENTS

| | | |
|---|---|---|
| 973,300 | Praetz | Oct. 18, 1910 |
| 1,039,902 | Cook | Oct. 1, 1912 |
| 2,655,747 | Duskin | Oct. 20, 1953 |

FOREIGN PATENTS

| | | |
|---|---|---|
| 218,491 | Great Britain | July 10, 1924 |